INVENTOR:
Herbert Austin
By J. H. Clarkson
Attorney

Patented Feb. 22, 1927.

1,618,746

UNITED STATES PATENT OFFICE.

HERBERT AUSTIN, OF BROMSGROVE, ENGLAND.

WINDOW AND WIND SCREEN.

Application filed February 5, 1926, Serial No. 86,238, and in Great Britain February 13, 1925.

This invention relates to windows and wind screens in which there are two or more sheets of glass with abutting edges, and where the one sheet of glass is required to turn in relation to the other across such abutting edge, and the invention has for its object to provide efficient means for closing the joint against draft and for preventing rattle.

According to the invention, each abutting edge, or one of them, is hollowed or troughed somewhat longitudinally, that is to say the edge of the glass, or a substantial portion of its width, is formed in a concave curve. Within such hollow there is laid a length of rubber tubing which should be of a very substantial gauge in proportion to its diameter, and this length of tubing is cemented or otherwise secured in relation to the hollowed edge, the other adjacent edge being arranged so that when the edges are brought together it bears against it with sufficient pressure to ensure a draught-tight joint and one which is free from rattle.

In order that the invention may be clearly understood a convenient application thereof is described with reference to the drawings herewith of which:—

Figure 1:
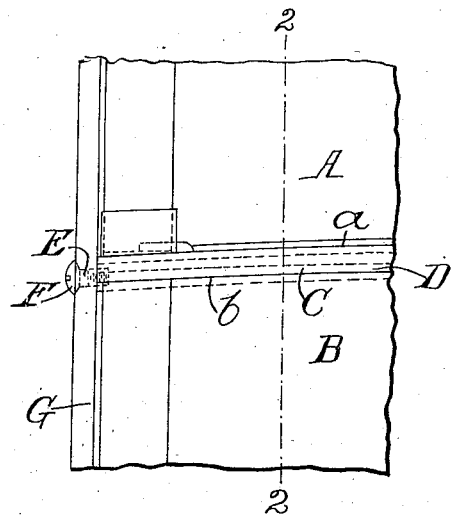
Figure 1 is a part front elevation of a wind screen comprising an upper and a lower light.
Figure 2:
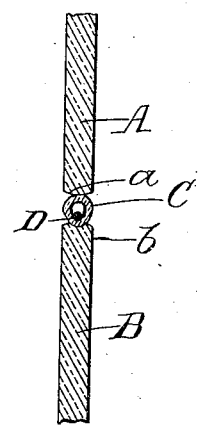
Figure 2 is a section taken on the line 2, 2, of Figure 1.
Figure 3:
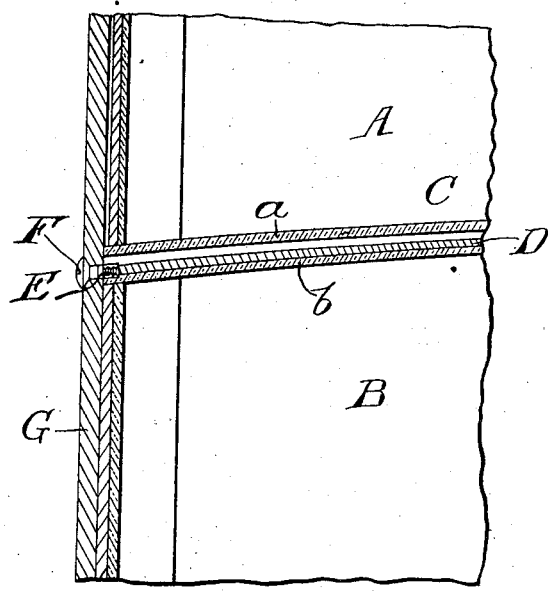
Figure 3 is a section taken in the plane of the wind screen.

In these drawings:—A is the upper light of the wind screen and B the lower light. The upper edge $b$ of the lower light B is formed hollow in transverse section while the lower edge $a$ of the light A is slightly convex. It will also be seen that the upper edge of the light B is slightly convex as seen in front elevation while the lower edge of the light A is correspondingly concave.

In the hollow of the edge $b$ there is laid a rubber tube C of a gauge which is large compared with its diameter and through the tube is passed a wire D which is preferably less in diameter than the internal diameter of the tube. The ends of the wire are screwed to receive long nuts one of which is shown at E, each nut having a head F of increased diameter. Each nut passes through a hole in the corresponding standard G, the head bearing upon the outer surface thereof or lying within a sinking formed in the outer surface. When the nuts are tightened up the wire tends to straighten and pull the rubber tube C hard against the hollow of the edge $b$, whereby the tube C is securely held in place.

In lieu of the wire the tube may be held in the hollow by cement or other adhesive.

The rubber tube constitutes a resilient packing between the adjacent edges of the lights and prevents draught and rattle in a very efficient manner and the tube has a certain amount of give on account of its elasticity and on account of the space left in the tube.

If desired, in order to ensure increased space in the tube the portion of wire within the tube may be flattened except at its screwed ends.

The nuts E may be passed into holes in the window framing or other fixed part in lieu of into the standards G.

Having fully described my invention what I claim and desire to secure by Letters Patent is:—

1. In a window or wind screen in which there are two lights of transparent material, two adjacent edges of which are adapted to be brought together or moved laterally apart when desired, means for effecting a packing between such edges comprising a rubber tube, a hollow in one of the edges to receive the tube, a wire passing through the tube and secured at its ends in relation to the respective light, said wire serving as the means for securing the rubber tube in relation to the said edge and said tube being adapted to bear against the other adjacent edge when the two edges are brought together.

2. In a window or wind screen in which there are two lights of transparent material two adjacent edges of which are adapted to be brought together or moved laterally apart when desired, means for effecting a packing between such edges comprising forming the one edge slightly convex as seen from the front while the other edge is correspondingly concave, a rubber tube, a hollow in the convex edge to receive the tube, a wire passing through the tube and secured at its ends in relation to the respective light, said wire, in conjunction with the convexity of the edge, serving as the means for securing the rubber tube in relation to such edge and said tube being adapted to bear against the concave edge of the other light when the two edges are brought together.

3. In a window or wind screen in which there are two lights of transparent material, two edges of which are adapted to be brought together or moved laterally apart when desired, means for effecting a packing between such edges comprising a rubber tube, a hollow in one of the edges to receive the tube, a wire of a diameter substantially less than the internal diameter of the tube, passing through the tube and being secured at its ends in relation to the respective light and serving as the means for securing the rubber tube in relation to the said edge, and said tube being adapted to bear against the other adjacent edge when the two edges are brought together.

4. In a window or wind screen in which there are two lights of transparent material, two edges of which are adapted to be brought together or moved laterally apart when desired, means for effecting a packing between such edges comprising a rubber tube, a hollow in one of the edges to receive the tube a flat wire passing through the tube and being secured at its ends in relation to the respective light and serving as the means for securing the rubber tube in relation to the said edge and said tube being adapted to bear against the other adjacent edge when the two edges are brought together.

5. In a window or wind screen in which there are two lights of transparent material, two adjacent edges of which are adapted to be brought together or moved laterally apart when desired, means for effecting a packing between such edges comprising a rubber tube, a hollow in one of the edges to receive the tube, a wire passing through the tube, nuts screwed on the ends of the wire and engaging in recesses in the side frames of the respective light, said wire serving as the means for securing the rubber tube in relation to the said edge, and said tube being adapted to bear against the other adjacent edge when the two edges are brought together.

In witness whereof I have hereunto signed my name this 19 day of January, 1926.

HERBERT AUSTIN.